United States Patent [19]
Mottram

[11] 3,906,988
[45] Sept. 23, 1975

[54] COMBINED VALVE AND PRESSURE INDICATOR FOR PNEUMATIC TIRES

[75] Inventor: Charles P. Mottram, Stratford, Conn.

[73] Assignee: National Distillers and Chemical Corporation, New York, N.Y.

[22] Filed: June 18, 1974

[21] Appl. No.: 480,334

[52] U.S. Cl. .............................. 137/227; 73/146.3
[51] Int. Cl.² ......................................... F16K 15/20
[58] Field of Search .......... 137/227, 224; 73/146.2, 73/146.3, 146.8; 152/427

[56] References Cited
UNITED STATES PATENTS

| | | | |
|---|---|---|---|
| 1,579,547 | 4/1926 | Vesconte | 137/227 |
| 1,807,752 | 6/1931 | Poster | 73/146.8 |
| 3,230,968 | 1/1966 | Struby | 137/227 |
| 3,670,688 | 6/1972 | Seaberg | 137/227 X |
| 3,792,677 | 2/1974 | Frost | 137/227 X |

*Primary Examiner*—Harold W. Weakley
*Attorney, Agent, or Firm*—Allen A. Meyer, Jr.

[57] ABSTRACT

A combined valve and wheel rim gauge for indicating visually whether the air pressure within the tire is adequate for safe operation. The device includes a flexible diaphragm which controls the movement of an indicating sleeve under varying conditions of internal air pressure to provide a continuous reading of under inflation, proper inflation and over inflation.

7 Claims, 6 Drawing Figures

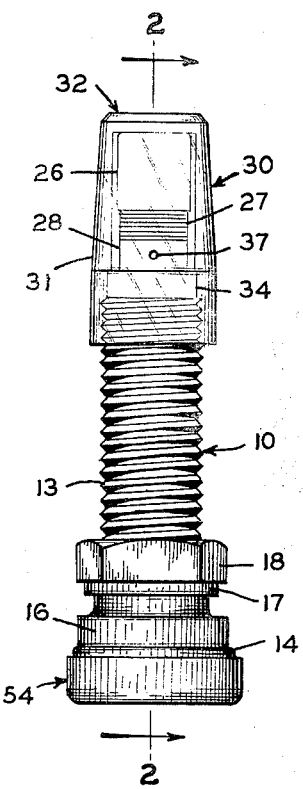
FIG. 1
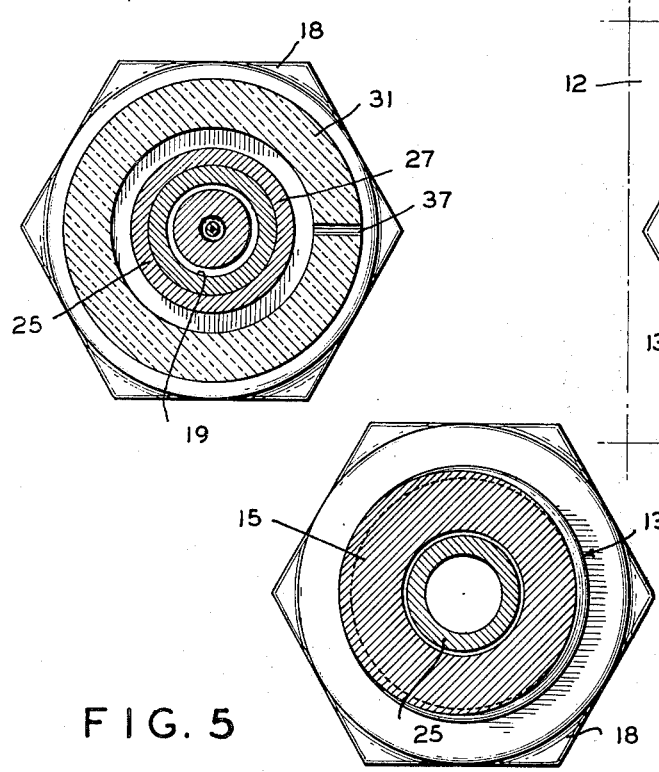
FIG. 4
FIG. 5
FIG. 6

COMBINED VALVE AND PRESSURE INDICATOR FOR PNEUMATIC TIRES

This invention relates to valves for pneumatic tires and the like and more particularly to such valves which will include as an integral part thereof indicating means which will provide a continuous reading as to whether the tire is properly inflated or over inflated, or whether the air pressure has dropped below a safe operating level.

Normally the air pressure within the tire is checked infrequently by, where necessary, removing a valve cap and applying a pressure gauge to the valve stem. Alternately, a visual check of the tire and wheel may indicate under inflation. However, with present day low pressure and radial type tires, such visual checks are far from adequate.

Accordingly, it is a major object of the present invention to provide a novel combined tire valve which will include as an integral part thereof a visual indicator, which may be color-coded, and which will provide a continuous reading as to the adequateness of the air pressure within the tire.

There have been continuing efforts, heretofore, along these lines; however, prior art devices are influenced by such adverse factors as friction, temperature conditions, introduction of foreign matter (dirt particles) into the valve stem, and the like, and have been found to be unreliable and thus not commercially acceptable.

The present invention obviates such existing problems as have been suggested hereabove and provides a unitary combined valve and indicator which is mounted in conventional fashion in an aperture provided in the tire rim, permits a continuous and accurate reading of air pressure conditions within the tire and where the indicating means — an integral part of the valve stem — is pilfer proof.

Further objects and advantages of the invention will be readily apparent from the following description, taken in conjunction with the accompanying drawings, wherein:

FIG. 1 is a side elevational view of the combined valve and indicator of the present invention;

FIG. 4 is a horizontal sectional view taken on the line 4—4 of FIG. 2;

FIG. 5 is a horizontal sectional view taken on the line 5—5 of FIG. 2; and

FIG. 6 is a horizontal sectional view taken on the line 6—6 of FIG. 2.

Figures 2, 3:
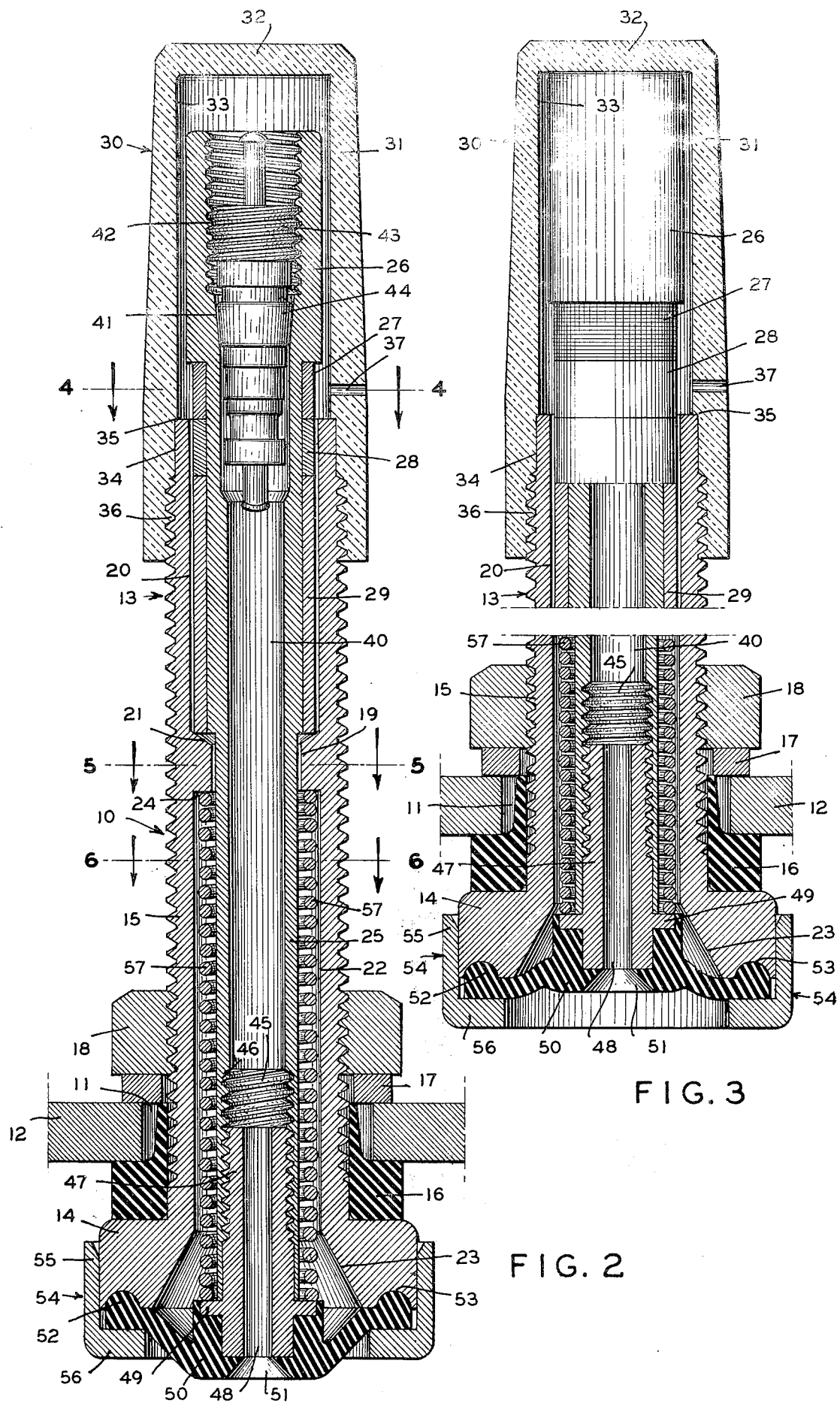
FIG. 2 is a vertical sectional view on an enlarged scale taken on the line 2—2 of FIG. 1 and with the valve mounted upon the rim of a wheel with the indicating means at its innermost position, illustrative of an under inflated or unsafe operating condition of the pneumatic tire.
FIG. 3 is a fragmentary vertical sectional view, also on an enlarged scale, similar to FIG. 2 and with the indicating means at an outer position illustrative of proper inflation and safe operating condition of the pneumatic tire.

Briefly, the combined valve and pressure indicator of the present invention includes an axially movable tubular body mounted for limited movement, responsive to air pressure interiorly of a pneumatic tire, within a tubular valve stem. In assembled relationship with respect to a rim-supported pneumatic tire, the inner extremity of this axially movable tubular body is located within the pneumatic tire casing and this inner extremity carries an end closure in the form of a flexible diaphragm and is urged normally under the influence of a coil spring or comparable resilient element in an inward direction with respect to the tire casing. The outer face of the diaphragm thus is exposed to air pressure within the tire casing and when this pressure reaches a predetermined (safe driving) level the axially movable tubular body is urged outwardly against the tension of the coil spring. The outer extremity of the axially movable body is provided with at least two visual signals and if only the outermost of these visual signals is visible, there is clear indication that the pneumatic tire is underinflated. Where the next adjacent visual signal is visible, as well as the outermost visual signal, there is clear indication that the tire is properly inflated. Under conditions where a portion of the axially movable tubular member beyond said next adjacent (or second) visual signal becomes visible, there is clear indication that the tire is over inflated with possible hazardous operating conditions by reason thereof. If desired, these visual signals may be color-coded or carry suitable legends or other indicia.

As shown in the drawings, particular reference being had to FIGS. 2 and 3, the combined valve and indicator 10 is mounted (in the embodiment illustrated) within a suitable aperture 11 in the conventional rim 12 of an automotive vehicle wheel. Preferably the combined valve and indicator 10 includes an elongated stem 13 having an enlarged head portion 14 at its inner extremity, the elongated stem being provided with external threads 15 extending substantially the entire length thereof. A resilient gasket or the like 16 surrounds the stem, immediately adjacent the enlarged portion head 14, and provides for a fluid-tight association between the rim 12 and enlarged head portion. A washer 17 engages the opposite surface of the rim 12 and a locking nut or the like 18 engaging the threaded portion 15 of the stem is provided to insure retention of the valve in fluid-tight association with the wheel rim.

The stem 13 is provided with an axial bore extending therethrough, this bore including a substantially centrally located portion 19 of reduced diameter and outer and inner portions 20 and 21, respectively. As illustrated more particularly in FIG. 2 of the drawings, the outer bore portion 20 terminates at its inner extremity in a tapered shoulder 21 at the juncture with the central bore portion 19. The inner bore portion 22 includes an outwardly tapered entry 23, extending through the head portion 14 of the stem, a shoulder 24 being provided at the juncture of the bore portion 22 with the centrally located portion 19.

An elongated generally cylindrical sleeve-like body 25 having an enlarged outer head portion 26 is mounted for reciprocatory movement within the stem 13, the body 25 including an inner portion of reduced diameter complementary to that of the central bore portion 19 of the stem and an intermediate portion of slightly increased diameter which extends to a shoulder created by the adjacent extremity of the enlarged head portion 26.

At least two indicating devices such as the sleeves or bands 27 and 28 are mounted upon the intermediate portion of the body 25. Desirably these bands carry appropriate indicia or may be differently colored and thus readily distinguishable from each other and the remainer of the valve structure and the outer band 27 (possibly red in color) which constitutes a low pressure visual signal is located in abutting relationship with respect to the inner extremity of the enlarged head portion 26. The inner band 28 (possibly white in color) constitutes a normal or safe-driving pressure visual signal and is located immediately adjacent and in abutting relationship with respect to the low pressure signal.

Suitable means is provided for insuring the accurate positioning of the visual signals 27 and 28 and one form of such means has been illustrated as the spacing sleeve 29 which also is carried upon the intermediate portion of the body 25. The length of this sleeve 29 is such that outer extremity thereof abuts the adjacent surface of the normal pressure signal 28 and the inner extremity of said spacing sleeve engages the tapered shoulder 21 of the axial bore which extends through the stem 13 when pressure within the tire is below the predetermined normal or safe driving level. As shown more clearly in FIG. 2 of the drawings, when the inner extremity of the stem 29 engages the limiting shoulder 21, the normal pressure visual signal 28 is within the stem 13 and concealed from view, only the low pressure signal 27 being visible. It is contemplated that instead of independent or separable visual signals 27 and 28, the sleeve 29 may be of sufficient length to extend outwardly into abutting relationship with the enlarged head 26 of the body 25 and carry suitable indicia in various forms including differently colored stripes or bands of paint or tape. Alternately, the sleeve 29 could be omitted and the peripheral surface of the intermediate portion of the body 25 could include appropriate visual signals or indicia.

A hollow end cap or closure 30 produced from relatively clear transparent material, through which the visual signals 27 and 28 will be readily visible, is provided. This cap, which includes a cylindrical side wall 31 and an end wall 32, has an axial bore or recess 33 extending inwardly from the inner extremity thereof. The recess 33 includes a concentric counterbore 34 terminating in a shoulder 35, the counterbore 34 being internally threaded as at 36 for engagement with the outer externally threaded portion 15 of the stem 13 and the shoulder 35 limiting the extent of threaded engagement between the cap and stem. Desirably the side wall 31 of the cap has at least one orifice 37 extending therethrough to provide communication between the recess 33 and the atmosphere. It will be noted that the construction and arrangement is such that when the axially movable body 25 is in its inner or low pressure position, the extremity of the enlarged head portion 26 is spaced from the inner surface of the end wall 32 of the cap 33 a distance substantially identical to the width of the normal pressure visual signal 28 and that this visual signal or indicator is within the confines of the stem 13 and thus obscured from view.

The reciprocal body 25 is provided with an axial bore 40 extending therethrough from end to end, the bore 40 terminating in a frusto-conical recess providing a valve seat 41 located within the enlarged head portion 26. Beyond the valve seat 41 this recess is internally threaded as indicated at 42 for engagement with the externally threaded portion 43 of a conventional air valve 44 which permits the tire to be inflated, or deflated, as is well known in this and related arts.

The inner or remote extremity of the axial bore 40 is internally threaded as at 45 for engagement with the complementarily externally threaded portion 46 of a tubular plug 47 which is provided with a centrally located axial bore 48 to permit air passage therethrough. The tubular plug 47 is provided, adjacent the inner free extremity thereof, with an enlarged peripheral flange or shoulder 49, the inner surface of which engages the extremity of the reciprocable body 25 when the plug is in assembled position.

A flexible generally concave diaphragm 50, molded from rubber or other suitable plastic material, is bonded to the extremity of the tubular plug 47 and the annular shoulder 49, this diaphragm having a centrally located aperture 51 in direct communication with the air passage or bore 48. The inner surface of the diaphragm 50 is provided with an integral upstanding annular bead 52 which is received within a complementarily conformed annular recess 53 in the adjacent end surface of the head portion 14 of the elongated stem 13. To retain the diaphragm and elongated valve stem in securely assembled relationship, a cup-shaped sealing ring 54 is provided, this sealing ring including a cylindrical wall portion 55 which engages frictionally the peripheral surface of the enlarged head portion 14 with, desirably, a press-fit therebetween. The sealing ring 54 also includes an integral end wall 56 which bears against the outer peripheral surface of the diaphragm insuring the secure retention of the bead 52 within its mating annular recess 53, a sealed relationship thus being established between the diaphragm and the valve stem.

To normally urge the reciprocable sleeve inwardly, toward a low pressure position, a calibrated coil spring or the like 57 is mounted upon the lower or inner portion of the reciprocable member 25 in surrounding relationship with respect thereto. The inner extremity of the spring 57 bears against the facing surface of the enlarged shoulder 49; similarly, the outer extremity of the coil spring bears against the shoulder 24 provided within the axial bore which extends through the stem 13.

The spring 57 normally urges the tubular plug 47 and sleeve-like body 25 inwardly under a predetermined force against any pressure existing within the pneumatic tire. It should be noted that if, when tested, the force exerted by the spring is found to be excessive, one or more convolutions thereof may be removed. Reversely, if the force exerted is found to be inadequate, one or more shims (spacers) may be provided immediately adjacent the abutting face of the shoulder 24.

In operation, the stem 13 is attached to the rim of an automobile wheel, pressure container, or the like, with the head 14 located within the rim and interiorly of the vehicle tire (or other container) and with the remainder of the stem extending exteriorly of said tire and rim. With the cap 30 removed, air or other fluid under pressure may be introduced into the tire or container through the body 25 and valve 44 housed therein until the pressure will have reached a predetermined level or until the interior pressure will have increased to the degree where the diaphragm 50 will overcome the tension of the spring 57 and reach the position illustrated in FIG. 3 of the drawings where the visual signal 28 indicative of a normal or safe operative pressure will be clearly visible. At this time the cap 30 may be replaced and as long as this predetermined interior pressure is maintained both visual signals 27 and 28 will be visible through the transparent side wall of the cap.

When the interior pressure falls below the predetermined normal operative level the tension of the spring 57 will move the body 25 axially (inwardly) of the stem 13 retracting the visual signal 25 to a position interiorly of the sleeve 29 and only the low pressure visual signal 27 will be visible through the transparent cap. By reason of the concave construction of the diaphragm 50, inward axial movement of the body 25 is resisted so long as the combined interior pressure and diaphragm inherent rigidity is sufficient to overcome the energy or pressure exerted by the spring 57. As the interior pressure drops, and pressure against the spring is reduced, the body 25 will move axially with a snap action until the inner extremity of the sleeve 29 engages the movement limiting shoulder or stop 21. It is contemplated that under normal interior pressure, indicative or safe operative conditions, the outer face of the enlarged head portion 26 will engage the interior surface of the end wall 32 of the cap 30, thereby insuring against rupture or distortion of the diaphragm 50 by reason of expansion of fluid due to such conditions as increased heat or the like.

It will be obvious to those skilled in this art that various changes may be made in the invention without departing from the spirit and scope thereof. Therefore the invention is not restricted by that which is shown in the drawings and described in the Specification and reference is had to the claims for summaries of the essentials of the invention and novel features of construction for all of which protection is desired.

What is claimed is:

1. A pressure indicating device for pneumatic tires comprising a valve stem having an axial bore extending therethrough, an elongated body of greater length than said stem mounted within said bore for reciprocatory movement, said tubular body being provided with an intermediate portion of enlarged diameter and an enlarged head portion on the outer extremity thereof, a flexible diaphragm having a centrally located aperture mounted upon the inner extremity of said tubular body, sealing means connecting the peripheral portion of said diaphragm to the adjacent extremity of said stem, resilient means normally urging said tubular body and associated diaphragm to an inward position, a tubular spacing sleeve mounted upon said intermediate portion, and at least two visual signal means constituted by annular bands mounted upon said intermediate portion and retained in adjusted spaced relationship between said spacing sleeve and said enlarged head portion, said tubular body being movable outwardly against the tension of said resilient means to expose said visual signals when fluid pressure within a pneumatic tire against said diaphragm reaches a predetermined level, any drop in fluid pressure within said tire below said predetermined level permitting said resilient means to move said tubular body inwardly of said valve stem a sufficient distance to conceal at least one of said visual signal means.

2. A pressure indicating device as set forth in claim 1 including removable transparent cap means mounted on the outer extremity of said stem means.

3. A pressure indicating device as set forth in claim 1 including stop means on said elongated tubular body to limit inward movement thereof.

4. A pressure indicating device as set forth in claim 3 where said stop means is constituted by a substantially centrally located portion of reduced diameter in said axial bore providing an annular shoulder and the elongated tubular body is provided with a portion of enlarged diameter, the inner extremity of which engages said annular shoulder when said elongated tubular body reaches its innermost position.

5. A pressure indicating device as set forth in claim 1 where said stem is provided with mounting means for engagement with the rim of a wheel.

6. A pressure indicating device as set forth in claim 1 where said valve stem is provided with an enlarged head portion on the inner extremity thereof, the end surface of said enlarged head portion being provided with an annular recess for the reception of a complementarily conformed peripheral bead on said diaphragm, and a cup-shaped sealing ring is provided for insuring a sealed relationship between said diaphragm and said valve stem.

7. A pressure indicating device as set forth in claim 1 including valve means mounted in the outer extremity of said elongated tubular member to permit passage of fluid under pressure through said axial bore.

* * * * *